| United States Patent [19] | [11] Patent Number: 4,743,651 |
| Shibuya et al. | [45] Date of Patent: May 10, 1988 |

[54] RESIN COMPOSITION OF POLYPHENYLENE ETHER AND POLYAMIDE

[75] Inventors: Nobuhiro Shibuya; Yoshihiro Sobajima; Hironari Sano, all of Mie, Japan

[73] Assignee: Mitsubishi Petrochemical Co., Ltd., Tokyo, Japan

[21] Appl. No.: 932,873

[22] Filed: Nov. 20, 1986

[30] Foreign Application Priority Data

Nov. 26, 1985 [JP] Japan ................................ 60-265358

[51] Int. Cl.$^4$ ............................................. C08L 53/00
[52] U.S. Cl. ........................................ 525/92; 525/96; 525/98; 525/391; 525/392; 525/905
[58] Field of Search ..................... 525/96, 98, 92, 391, 525/392, 396, 397, 905

[56] References Cited

U.S. PATENT DOCUMENTS

| 3,379,792 | 4/1968 | Finholt ................................ 525/905 |
| 4,315,086 | 2/1982 | Ueno et al. ........................... 525/391 |
| 4,338,421 | 7/1982 | Maruyama et al. ................. 525/397 |
| 4,339,376 | 7/1982 | Kasahara et al. .................... 524/116 |

FOREIGN PATENT DOCUMENTS 0024120  2/1981  European Pat. Off. .
0164767  12/1985  European Pat. Off. .

*Primary Examiner*—Theodore E. Pertilla
*Attorney, Agent, or Firm*—Oblon, Fisher, Spivak, McClelland & Maier

[57] ABSTRACT

A resin composition comprising a resin component comprising a polyphenylene ether resin and a polyamide resin, an aromatic vinyl compound-conjugated diene block copolymer, and a compound having an unsaturated group and a polar group in the molecule thereof. The composition is excellent in impact strength both at low temperature and room temperature, tensile elongation indicative of toughness, and organic solvent resistance.

24 Claims, No Drawings

RESIN COMPOSITION OF POLYPHENYLENE ETHER AND POLYAMIDE

FIELD OF THE INVENTION

This invention relates to a resin composition excellent in mechanical strength balance, oil resistance, moldability and coating properties. More particularly, it relates to a resin composition for injection molding, extrusion molding and blow molding which is excellent in balance of mechanical strength characteristics, such as impact strength and tensile elongation indicative of toughness, thermal stiffness, and resistance to organic solvents.

BACKGROUND OF THE INVENTION

Polyphenylene ether resins are noted as engineering resins having excellent mechanical and thermal properties.

However, the polyphenylene ether resins when used alone are seriously inferior in solvent resistance. In order to overcome this drawback, it has been proposed to blend the polyphenylene ether resins with polyamide-based resins as disclosed in Japanese patent publication No. 41663/84 (corresponding to U.S. Pat. No. 4,338,421), or with polyester-based resins as disclosed in Japanese patent publication Nos. 21662/76, 21663/76 and 21664/76. Although these polymer blends exhibit improved solvent resistance, they do not always satisfy conditions required for practical use in industry due to insufficient mechanical strength, especially impact strength. Also, the polyphenylene ether resins when used alone are inferior in moldability and impact strength other than in solvent resistance. In order to overcome these drawbacks, it has been proposed to blend the polyphenylene ether resins with high impact polystyrene. This polymer blend is now made use of, but its application is limited because of so poor resistance to solvent.

For the purpose of improving impact strength of the resin composition comprising polyphenylene ether resins and polyamide-based resins, incorporation of a liquid polybutadiene polymer [Japanese patent laid-open application No. 10642/82 and Japanese patent publication No. 11966/85 (each corresponding to U.S. Pat. No. 4,315,086)] or of a rubbery material and a compound containing a carboxyl group, an imido group, an epoxy group, etc. (Japanese patent laid-open application No. 49753/81) thereto has been proposed. These resin compositions, though showing an improvement in solvent resistance, do not always attain the levels required in the industrial field in terms of impact strength and tensile elongation indicative of toughness in the vicinity of room temperature and in terms of low temperature impact strength.

The inventors have previously found that a resin composition comprising a polyphenylene ether resin, a polyamide resin, and a partially hydrogenated aromatic vinyl compound-conjugated diene block copolymer to which maleic anhydride, etc., is grafted shows high impact strength as well as a good balance of other mechanical properties and is useful as a molding material for industrial parts, such as exterior automotive trims, etc., as disclosed in Japanese patent application No. 220737/85.

However, the proposed resin composition does not always meet the relatively severe requirements in the industrial field in terms of low temperature impact strength, tensile elongation, and the like. Besides, the resin composition leaves room for improvement on cost incurred.

SUMMARY OF THE INVENTION

One object of this invention is to provide a resin composition comprising a polyphenylene ether resin and a polyamide resin, which is excellent in resistance to organic solvents, tensile elongation indicative of toughness, and impact strength, particularly low temperature impact strength.

The feature of this invention lies in incorporation of a specific elastomer and a compound having an unsaturated group and a polar group per molecule in the polyphenylene ether resin and polyamide resin. That is, it has now been found that a resin composition comprising a polyphenylene ether resin, a polyamide resin, a block copolymer of an aromatic vinyl compound and a conjugated diene, and a compound having an unsaturated group and a polar group in the molecule exhibits excellent impact strength, particularly low temperature impact strength, and high tensile elongation and also offers an advantage of low production cost, thus reached the present invention.

The present invention provides a resin composition comprising (1) from 50 to 97% by weight, based on the total amount of components (1) and (2), of a resin component comprising (a) a polyphenylene ether resin and (b) a polyamide resin, (2) from 3 to 50% by weight, based on the total amount of components (1) and (2), of (c) a block copolymer of an aromatic vinyl compound and a conjugated diene, and (3) from 0.01 to 30 parts by weight, per 100 parts by weight of the total amount of components (1) and (2), of (d) a compound having an unsaturated group and a polar group in the molecule thereof.

The resin composition according to this invention exhibits high level impact strength, especially low temperature impact strength, and excellent tensile elongation that is an indication of toughness, as well as satisfactory resistance to organic solvents, as compared with conventional resin compositions containing polyphenylene ether resins and polyamide resins.

DETAILED DESCRIPTION OF THE INVENTION

The polyphenylene ether resin (a) which can be used as one of the resin components (1) has a recurring unit represented by formula (I):

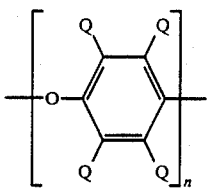

(I)

wherein the ether oxygen atom in one unit is connected to the benzene nucleus of the adjacent unit; n is at least 50; and Q (which may be the same or different) each represents a monovalent group selected from the group consisting of a hydrogen atom, a halogen atom, a hydrocarbon group having no tertiary α-carbon atom, a halogenated hydrocarbon group having at least two carbon atoms between the halogen atom thereof and the phenyl nucleus, a hydrocarbon oxy group, or a halogenated hydrocarbon oxy group having at least two carbon atoms between the halogen atom thereof and the phenyl nucleus.

Typical examples of the polyphenylene ether resins include poly(2,6-dimethyl-1,4-phenylene) ether, poly(2,6-diethyl-1,4-phenylene) ether, poly(2-methyl-6-ethyl-1,4-phenylene) ether, poly(2-methyl-6-propyl-1,4-phenylene) ether, poly(2,6-dipropyl-1,4-phenylene) ether, poly(2-ethyl-6-propyl-1,4-phenylene) ether, poly(2,6-dibutyl-1,4-phenylene) ether, poly(2,6-dipropenyl-1,4- phenylene) ether, poly(2,6-dilauryl-1,4-phenylene) ether, poly(2,6-diphenyl-1,4-phenylene) ether, poly(2,6- dimethoxy-1,4-phenylene) ether, poly(2,6-diethoxy-1,4- phenylene) ether, poly(2-methoxy-6-ethoxy-1,4-phenylene) ether, poly(2-ethyl-6-stearyloxy-1,4-phenylene) ether, poly(2,6-dichloro-1,4-phenylene) ether, poly(2-methyl- 6-phenyl-1,4-phenylene) ether, poly(2,6-dibenzyl-1,4- phenylene) ether, poly(2-ethoxy-1,4-phenylene) ether, poly(2-chloro-1,4-phenylene) ether, poly(2,5-dibromo- 1,4-phenylene) ether, and the like.

The polyphenylene ether resins to be used in this invention further include copolymers, such as a copolymer of 2,6-dimethylphenol and 2,3,6-trimethylphenol, a copolymer of 2,6-dimethylphenol and 2,3,5,6-tetramethylphenol, a copolymer of 2,6-diethylphenol and 2,3,6-trimethylphenol, etc.

In addition, the polyphenylene ether resins which can be used in this invention furthermore include modified ones, such as the polyphenylene ethers having the recurring unit of formula (I) to which a styrene-based monomer, e.g., styrene, p-methylstyrene, α-methylstyrene, etc., is grafted.

Processes for preparing the aforesaid polyphenylene ether resins are known and described, e.g., in U.S. Pat. Nos. 3,306,874, 3,306,875, 3,257,357, and 3,257,358, Japanese patent publication No. 17880/77 (corresponding to U.S. Pat. No. 4,011,200), and Japanese patent laid-open application No. 51197/75 (corresponding to U.S. Pat. No. 3,929,930).

Among the above-described polyphenylene ether resins, the preferred are those having an alkyl group at each of the two ortho-positions with respect to the ether oxygen atom, and copolymers of 2,6-dialkylphenols and 2,3,6-trialkylphenols, with the more preferred being a homopolymer of 2,6-dimethylphenol and a copolymer of 2,6-dimethylphenol and 2,3,6-trimethylphenol. The most preferred is a homopolymer of 2,6-dimethylphenol.

The polyphenylene ether resin to be used preferably has such a molecular weight as having an intrinsic viscosity ranging from 0.35 to 0.70 dl/g, more preferably from 0.40 to 0.60 dl/g, and furthermore preferably from 0.45 to 0.55 dl/g, as determined in chloroform at 30° C. Intrinsic viscosities less than 0.35 dl/g result in insufficient impact strength of molded articles, and those more than 0.70 dl/g readily cause a difficulty in molding.

The polyamide resins (b) which can be used as another resin component in the present invention are polymers having a

linkage in their main chain and capable of being melted by heating. Typical examples of the polyamide resins include an aliphatic polyamide resin such as nylon-4, nylon-6, nylon-6,6, nylon-4,6, nylon-12, nylon-6,10, etc., and other known transparent nylons. Of these, nylon-6,6 and nylon-6 are particularly preferred. Commercially available nylon resins, such as Ultramide produced by BASF (West Germany), etc., can be utilized.

The aromatic vinyl compound-conjugated diene block copolymers (c) which can be used as component (2) in the present invention are represented by formula (II):

wherein A represents a block of a polymerized aromatic vinyl compound; B represents an elastomeric block of a polymerized conjugated diene; m represents 0 or a positive integer; and n represents 0 or 1.

The aromatic vinyl compound monomer constituting the block A includes styrene, alkyl-substituted styrenes, α-methylstyrene, vinyltoluene, other lower alkyl-substituted styrenes, vinylnaphthalene, a combination thereof, etc., with styrene, alkyl-substituted styrenes and a combination thereof being preferred, and styrene being more preferred.

The conjugated diene monomer constituting the block B includes butadiene, isoprene, a combination of butadiene and isoprene and, in addition, cyclopentadiene and its derivatives, lower alkyl-substituted butadienes (e.g., 2,3-dimethylbutadiene, etc.), and the like, with butadiene, isoprene and a combination thereof being preferred and butadiene being particularly preferred. The block B may further contain olefin-based hydrocarbons, e.g., ethylene, propylene, 1-butene, etc., or non-conjugated dienes as far as they do not greatly impair the elastomeric properties of the block B.

In general, the block A has a weight average molecular weight of from 500 to 125,000, and preferably from 2,000 to 110,000; and that of the block B is from 500 to 250,000, and preferably from 5,000 to 220,000. Blocks A and B having smaller molecular weights may be contained in parts of the block copolymer (c).

The proportion of the block A in the block copolymer (c) greatly influences impact strength and toughness of the resin composition of the invention and is preferably from 20 to 50% by weight, more preferably from 25 to 50% by weight, furthermore preferably from 31 to 45% by weight, and most preferably from 35 to 45% by weight. If it is less than 20% by weight, the impact strength level reached is unsatisfactory, and if it exceeds 50% by weight, impact strength and tensile elongation become insufficient.

In order to achieve the purposes of the invention, a solution viscosity (Brookfield viscosity in a 25% by weight toluene solution at 25° C.) of the block copolymer (c), which is indicative of a molecular weight, preferably falls within a range of from 200 to 100,000 cps, more preferably from 600 to 25,000 cps, furthermore preferably from 600 to 10,000 cps, and most preferably from 800 to 8,000 cps. Solution viscosities out of the above-recited broadest range unfavorably result in insufficient impact strength.

A part of, generally up to 50% of, the double bonds derived from the conjugated diene may be hydrogenated, if desired.

Commercially available products, such as Kraton-D or Kariflex produced by Shell Chemical Co., TR produced by Japan Synthetic Rubber Co., Ltd., etc., may be utilized as the block copolymer (c).

These block copolymers (c) may be used either individually or in combinations of two or more thereof.

The compound (d) having an unsaturated group and a polar group in the molecule thereof which can be used as component (3) in the resin composition of the invention is a compound having at least one unsaturated group, i.e., a carbon-carbon double bond or a carbon-carbon triple bond, and at least one polar group, i.e., a functional group which shows affinity or chemical reactivity to the amido linkage contained in the polyamide resin or a carboxyl group or an amino group present at the chain terminals. Such a polar group includes a carboxyl group, a group derived from carboxylic acid derivatives in which a hydrogen atom or a hydroxyl group of the carboxylic group is substituted (e.g., salts, esters, acid amides, acid anhydrides, imides, acid azides, and acid halides), an oxazolyl group, a nitryl group, an epoxy group, an amino group, a hydroxyl group, an isocyanic ester group, and the like.

The compounds having both the unsaturated group and the polar group in the molecule thereof include unsaturated carboxylic acid and derivatives thereof, unsaturated epoxy compounds, unsaturated alcohols, unsaturated amines and unsaturated isocyanic esters.

Specific examples of the compounds (d) are unsaturated dicarboxylic acids and the derivatives thereof, e.g., maleic anhydride, maleic acid, fumaric acid, maleimide, maleic hydrazide, a reaction product between maleic anhydride and a diamine, e.g., those having formula (III) or (IV):

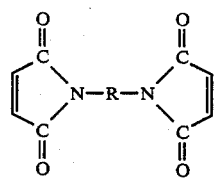

(III)

or

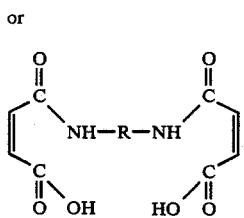

(IV)

(wherein R represents an aliphatic or aromatic group), methyl nadic anhydride, dichloromaleic anhydride, maleic amide, itaconic acid, itaconic anhydride; naturally-occurring fats and oils, e.g., soybean oil, tung oil, castor oil, linseed oil, hempseed oil, cotton seed oil, sesame oil, rapeseed oil, peanut oil, tsubaki oil, olive oil, coconut oil, sardine oil, etc.; epoxidized natural fats and oils, e.g., epoxidized soybean oil, epoxidized linseed oil, etc.; unsaturated carboxylic acids, e.g., acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenoic acid, 2-octenoic acid, 4-decenoic acid, 9-undecenoic acid, 10undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, dococenoic acid, erucic acid, tetracosenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linoleic acid, octadecatrienoic acid, eicosadienoic acid, eicosatrienoic acid, eicosatetraenoic acid, ricinoleic acid, eleostearic acid, oleic acid, eicosapentaenoic acid, docosadienoic acid, docosatrienoic acid, docosatetraenoic acid, docosapentaenoic acid, tetracosenoic acid, hexacosenoic acid, hexacosadienoic acid, octacosenoic acid, tetracontenoic acid, etc.; the derivatives (e.g., esters, acid amides or anhydrides) of these unsaturated carboxylic acids; unsaturated alcohols, e.g., allyl alcohol, crotyl alcohol, methylvinylcarbinol, allylcarbinol, methylpropenylcarbinol, 4-penten-1-ol, 10-undecen-1-ol, propargyl alcohol, 1,4- pentadien-3-ol, 1,4-hexadien-3-ol, 3,5-hexadien-2-ol, 2,4-hexadien-1-ol, oleyl alcohol, alcohols represented by formulae $C_nH_{2n-5}OH$, $C_nH_{2n-7}OH$, or $C_nH_{2n-9}OH$ (wherein n is a positive integer), 3-butene-1,2-diol, 2,5-dimethyl-3-hexene-2,5-diol, 1,5-hexadiene-3,4-diol, 2,6-octadiene-4,5-diol, etc.; unsaturated amines in which the hydroxyl group of the above-enumerated unsaturated alcohols is displaced with an amino group ($-NH_2$); polymers of butadiene, isoprene, etc., having low molecular weights (e.g., from 500 to 10,000) or high molecular weights (e.g., above 10,000) to which maleic acid, maleic anhydride or a phenol is added, or to which an amino group, a carboxyl group, a hydroxyl group, an epoxy group, etc., is introduced; allyl isocyanate; and the like.

These functional group-containing compounds may be used either individually or in combinations of two or more thereof. The preferred among these compounds are unsaturated dicarboxylic acids and the anhydrides thereof, e.g., maleic anhydride, maleic acid, itaconic acid, etc.; unsaturated alcohols, e.g., oleyl alcohol, etc.; epoxidized natural fats and oils, e.g., epoxidized soybean oil, epoxidized linseed oil, etc.; and a low molecular polybutadiene having a molecular weight ranging from about 500 to about 2,500 to which maleic anhydride or maleic acid is added. The more preferred among them are maleic anhydride, maleic acid, oleyl alcohol, epoxidized soybean oil, epoxidized linseed oil, and a low molecular polybutadiene having a molecular weight of from about 500 to about 2,000 to which maleic anhydride or maleic acid is added in an amount of from about 5% to about 20% by weight. Inter alia, maleic anhydride and a mixture of maleic anhydride and maleic acid are particularly preferred.

According to the present invention, a resin composition exhibiting satisfactory impact strength both at a low temperature and room temperature can be obtained by using the above-described aromatic vinyl compound-conjugated diene block copolymer (c) and the compound having an unsaturated group and a polar group in the molecule thereof (d) in combination with the resin component (1) comprising the polyphenylene ether resin (a) and the polyamide resin (b).

In view of obtaining thermal stiffness (flexural modulus and heat deflection temperature) and organic solvent resistance, the component (1) preferably comprises from 30 to 90 parts by weight, more preferably from 35 to 70 parts by weight, and most preferably from 40 to 60 parts by weight, of the polyamide resin (b) per 100 parts by weight of the total amount of the polyphenylene ether resin (a) and the polyamide resin (b). When the proportion of the polyamide resin is less than 30 parts by weight, organic solvent resistance is not sufficient, and when it exceeds 90 parts by weight, thermal stiffness becomes unsatisfactory.

The content of the component (1) comprising the polyphenylene ether resin and the polyamide resin in the resin composition of the invention ranges from 50 to 97% by weight, preferably from 65 to 95% by weight, and more preferably from 70 to 92% by weight, based on the total amount of components (1) and (2).

The content of the aromatic vinyl compound-conjugated diene block copolymer as component (2) in the resin composition ranges from 3 to 50% by weight, preferably from 5 to 35% by weight, and more preferably from 8 to 30% by weight, based on the total amount of components (1) and (2). If it is less than 3% by weight, the impact strength level reached is insufficient. On the other hand, if it exceeds 50% by weight, the stiffness level obtained is unsatisfactory.

The content of the compound (d) as component (3) in the resin composition of the invention ranges from 0.01 to 30 parts by weight, preferably from 0.01 to 15 parts by weight, more preferably from 0.05 to 15 parts by weight, furthermore preferably from 0.1 to 5 parts by weight, and most preferably from 0.2 to 2 parts by weight, per 100 parts by weight of the total amount of the components (1) and (2). If it is less than 0.01 part by weight, the impact strength becomes poor. Proportions exceeding 30 parts by weight not only result in unsatisfactory levels of stiffness and impact strength but also readily cause a poor appearance of molded articles.

If desired, the resin composition according to the present invention may further contain thermoplastic or thermosetting resins other than the above-described polyphenylene ether resins and polyamide resins; elastomer compounds other than the aforesaid block copolymer (c); and various additives, such as antioxidants, weathering stabilizers, nucleating agents, slip agents, inorganic or organic fillers, reinforcing agents, flame retardants, various colorants, antistatic agents, parting agents, and the like. In particular, fillers, such as glass fiber, mica, talc, calcium silicate, calcium carbonate, etc., are effective to improve physical properties (e.g., stiffness, dimensional accuracy, dimensional stability, etc.).

The resin composition according to the present invention can be prepared by blending the above-described components by various blending methods generally employed for blending of resins, blending of resins with stabilizers or colorants, or blending of resins with fillers. For example, each of the components in the form of powders or granules is uniformly dispersed and mixed by means of a Henschel mixer, a supermixer, a ribbon blender, a V blender, etc., and the resulting compound is then melt-kneaded at a temperature generally ranging from 200 ° to 350° C. by means of a melt kneader, such as a twin screw extruder, a single screw extruder, a roll, a Banbury mixer, a plastomill, a Brabender Plastograph, etc. The resulting molten resin composition is extruded in pellets.

On the other hand, the aromatic vinyl compound-conjugated diene block copolymer (c) as component (2) and the compound having an unsaturated group and a polar group in the molecule thereof (d) as component (3) may be mixed in advance at room temperature, or a solution of the compound having an unsaturated group and a polar group in the molecule thereof (d) in a volatile organic solvent, e.g., acetone, alcohols, heptane, xylene, diethyl ether, benzene, etc., may be coated on the block copolymer (c). These methods are applicable, during the conventional blending and kneading.

The resin composition according to the present invention can be molded easily by molding techniques commonly employed for thermoplastic resins, such as injection molding, extrusion molding, blow molding, and the like. Of these methods, injection molding is most preferred.

The resin composition of the present invention exhibits excellent mechanical physical properties and is, therefore, suitable as molding materials for automobile parts, such as exterior parts, e.g., a bumper, a door panel, a fender, a mole, an emblem, a wheel cover, an engine cover, a roof, a spoiler, etc., and interior parts, e.g., an instrument panel, a console box, a trim, etc.; exterior parts of electrical appliances, e.g., TV sets, refrigerators, etc.; parts of the so-called office automation systems; and the like.

This invention will now be illustrated in greater detail with reference to the following examples and comparative examples, but it should be understood that they are not intended to limit the present invention. In these examples and comparative examples, various physical properties were measured or evaluated according to the following methods:

(1) Flexural Modulus:

Measured with an Instron tester in accordance with ISO R178-1974, Procedure 12 (JIS K7203).

(2) Izod Impact Strength (Notched):

Measured using an Izod impact tester manufactured by Toyo Seiki Seisakusho in accordance with ISO R180-1969 (JIS K7110).

(3) Dart Drop Impact Strength:

A dart (2 m×7 kgf) as a load-sensing element is dropped on a specimen (120×80×2 mm) mounted on a clamping flame having a hole diameter of 40 mm, and the deformation and failure behaviors of the specimens under impact load are measured. The impact energy absorbed up to the crack initiation in the resulting impact pattern is calculated and taken as an impact strength value.

(4) Organic Solvent Resistance:

Measured in accordance with the Bergen's method described in *SPE Journal*, Vol. 667 (1962). Specifically, a 2 mm thick specimen is fixed to a conventional Bergen jig (quarter ellipse) having a longer axis of 24 cm and a shorter axis of 8 cm and dipped in commercially available gasoline for 5 minutes. The minimum strain at the crack initiation is determined as a limiting strain. The solvent resistance is evaluated according to the following scale:

Excellent: No cracking occurs.

Good: The limiting strain is 1.5% or more.

Moderate: The limiting strain is between 1.0% and 1.5%.

Poor: The limiting strain is less than 1.0%.

(5) Tensile Elongation:

Measured using an Instron tester at a rate of pulling of 20 mm/min in accordance with ISO R527-1966 (JIS K6758-1968).

(6) Heat Deflection Temperature:

Measured in accordance with ISO R75-1958 Method A (JIS K7207-1974, A Method). In the measurement, injection-molded specimens were used without annealing.

EXAMPLES 1 TO 10 AND COMPARATIVE EXAMPLES 1 TO 5

Components specified below were mixed and stirred sufficiently in a supermixer in accordance with Table 1, and the blend was melt-kneaded at 280° C. in a twin screw extruder ("PCM" manufactured by Ikegai Iron Works, Ltd.) and extruded in a strand, which was then chopped into pellets.

The resulting pellets were injection-molded using an in-line screw type injection molding machine ("IS-90B" manufactured by Toshiba Machine Co., Ltd.) at a cylinder temperature of 280° C. and a mold cooling temperature of 80° C. to prepare specimens. Prior to the injection molding, the pellets were dried in a vacuum drier under conditions of 0.1 mm Hg and 80° C. for 48 hours.

The components used in these examples and comparative examples are as follows:

(1) Polyphenylene Ether (PPE):
Poly(2,6-dimethyl-1,4-phenylene) ether (intrinsic viscosity: 0.50 dl/g in 30° C. chloroform)

(2) Polyamide:

| Abbreviation | Viscosity | Trade Name | Maker |
|---|---|---|---|
| PA-6,6(L) | Low | Ultramide A3 | BASF |
| PA-6,6(M) | Medium | Ultramide A4 | " |
| PA-6(H) | High | Ultramide B5 | " |

(3) Aromatic Vinyl Compound-Conjugated Diene Block Copolymer:

| Abbreviation | Comonomers | Styrene Content (wt %) | Trade Name | Maker |
|---|---|---|---|---|
| SB-1 | Styrene-Butadiene | 28 | Kraton D1102 | Shell Chemical Co. |
| SB-2 | Styrene-Butadiene | 30 | Kraton D1101 | Shell Chemical Co. |
| SB-3 | Styrene-Butadiene | 40 | TR2000 | Japan Synthetic Rubber Co., Ltd. |
| SB-4 | Styrene-Butadiene | 60 | TR2400 | Japan Synthetic Rubber Co., Ltd. |
| SI-1 | Styrene-Isoprene | 14 | Kraton D1107 | Shell Chemical Co. |
| SBR* (Comparison) | Styrene-Butadiene | 24 | SL552 | Japan Synthetic Rubber Co., Ltd. |

Note:
*Random Copolymer (4) Compound Having Unsaturated Group and Polar Group per Molecule:
(a) Commercially available maleic anhydride (reagent grade)
(b) Commercially available oleyl alcohol (reagent grade)
(c) Epoxidized liquid polybutadiene having a molecular weight of about 1,000 and a 1,2-bond content of about 80%, in which the carbon-carbon double bond is epoxidized to an epoxy group content of about 7.5% ("BF1000" produced by Adeka Argus Chemical Co., Ltd.)

Each of the resulting specimens was evaluated for various properties according to the above-described methods, and the results obtained are shown in Table 2.

TABLE 1

| Component | Example 1 | 2 | 3 | 4 | 5 | 6 | Comparative Example 1 | 2 | 3 | 4 | Example 7 | 8 | 9 | 10 | Comp. Ex. 5 |
|---|---|---|---|---|---|---|---|---|---|---|---|---|---|---|---|
| Component (1) (wt %) | 86 | 86 | 86 | 82 | 86 | 86 | 100 | 86 | 86 | 84 | 86 | 91 | 90 | 90 | 86 |
| PPE (part by weight*) | 50 | 50 | 50 | 50 | 60 | 40 | 50 | 50 | 50 | 50 | 50 | 50 | 45 | 45 | 50 |
| PA-6, 6(L) (part by weight*) | 50 | 50 | 50 | 50 | — | — | 50 | 50 | 50 | 50 | — | 50 | 55 | 55 | 50 |
| PA-6, 6(M) (part by weight*) | — | — | — | — | 40 | 60 | — | — | — | — | — | — | — | — | — |
| PA-6(H) (part by weight*) | — | — | — | — | — | — | — | — | — | — | 50 | — | — | — | — |
| Component (2): Kind | SB-1 | SB-2 | SB-3 | SB-1 | SB-1 | SB-1 | — | SI-1 | SB-4 | SBR | SB-1 | SB-1 | SB-3 | SB-1 | SB-1 |
| Amount (wt %) | 14 | 14 | 14 | 18 | 14 | 14 | — | 14 | 14 | 16 | 15 | 9 | 10 | 10 | 14 |
| Styrene Content (wt %) | 40 | 30 | 28 | 40 | 40 | 40 | — | 14 | 60 | 24 | 40 | 40 | 28 | 40 | 40 |
| Component (3): Kind | (a) | (a) | (a) | (a) | (a) | (a) | — | (a) | (a) | (a) | (a) | (a) | (b) | (c) | — |
| Amount (part by weight**) | 0.5 | 0.5 | 0.5 | 0.6 | 0.6 | 0.6 | — | 0.5 | 0.5 | 0.6 | 0.6 | 0.3 | 0.9 | 1.7 | — |

Note:
*Per 100 parts by weight of the total amount of PPE and PA (component (1)).
**Per 100 parts by weight of the total amount of components (1) and (2).

TABLE 2

| | Example 1 | 2 | 3 | 4 | 5 | 6 | Comparative Example 1 | 2 | 3 | 4 |
|---|---|---|---|---|---|---|---|---|---|---|
| Flexural Modulus (kg/cm$^2$) | | | | | | | | | | |
| at 23° C. | 19800 | 19500 | 19400 | 18000 | 20500 | 20700 | 23600 | 20300 | 22400 | 18900 |
| at 80° C. | 9900 | 9700 | 9700 | 8800 | 11400 | 7100 | 13100 | 10600 | 11800 | 9200 |
| Heat Deflection Temperature (18.6 kg/cm$^2$) (°C.) | 134 | — | 133 | 106 | 137 | 82 | 144 | 134 | — | — |
| Izod Impact Strength (kg · cm/cm) | | | | | | | | | | |
| at 23° C. | 27 | 26 | 27 | 30 | 26 | 28 | 3.8 | 4.8 | 9.4 | 11.8 |
| at −30° C. | 13 | 12 | 13 | 14 | 11 | 13 | 3.1 | 4.0 | 5.0 | 4.8 |
| Dart Drop Impact | | | | | | | | | | |

TABLE 2-continued

| Strength (kg · cm) | | | | | | | | | | |
|---|---|---|---|---|---|---|---|---|---|---|
| at 23° C. | 69 | 58 | 60 | 76 | 53 | 70 | 13 | 14 | 41 | 28 |
| at −30° C. | 38 | 36 | 37 | 42 | 38 | 45 | 8 | 10 | 19 | 18 |
| Tensile Elongation (%) | 110 | 120 | 120 | 130 | 110 | 130 | 10 | 20 | 40 | 40 |
| Solvent Resistance | excellent | excellent | excellent | excellent | excellent | excellent | excellent | excellent | excellent | excellent |

| | | Example | | | | Comp. |
|---|---|---|---|---|---|---|
| | | 7 | 8 | 9 | 10 | Ex. 5 |
| | Flexural Modulus (kg/cm$^2$) | | | | | |
| | at 23° C. | 20300 | 21600 | 21200 | 20900 | 20700 |
| | at 80° C. | 9800 | 12100 | 10900 | 10300 | 10600 |
| | Heat Deflection Temperature (18.6 kg/cm$^2$) (°C.) | 123 | 129 | 129 | 129 | — |
| | Izod Impact Strength (kg · cm/cm) | | | | | |
| | at 23° C. | 30 | 17 | 15 | 16 | 5.4 |
| | at −30° C. | 12.5 | 7.6 | 7.0 | 6.8 | 3.2 |
| | Dart Drop Impact Strength (kg · cm) | | | | | |
| | at 23° C. | 96 | 44 | 42 | 38 | 16 |
| | at −30° C. | 45 | 36 | 33 | 30 | 12 |
| | Tensile Elongation (%) | 150 | 110 | 100 | 90 | 20 |
| | Solvent Resistance | excellent | excellent | excellent | excellent | excellent |

From the results of Table 2, the following considerations can be derived. By comparing Examples 1 to 3 with Comparative Examples 1 to 4, it can be seen that the resin compositions according to the present invention, wherein an aromatic vinyl compound-conjugated diene block copolymer containing the aromatic vinyl compound unit in a specific proportional range is used as an elastomeric component (2), exhibit particularly high impact strength as well as satisfactory thermal stiffness, organic solvent resistance and tensile elongation. It can also be seen from Examples 1 and 7 that the effects of the present invention can be exerted when various polyamide resins are used. Further, a comparison between Examples 8 to 10 and Comparative Example 5 clearly proves the effects of the present invention produced by the use of the compounds having both an unsaturated group and a polar group in the molecule thereof.

While the invention has been described in detail and with reference to specific embodiments thereof, it will be apparent to one skilled in the art that various changes and modifications can be made therein without departing from the spirit and scope thereof.

What is claimed is:

1. A resin composition prepared by melt-kneading a mixture comprising (1) from 50 to 97% by weight, based on the total amount of components (1) and (2), of resin component comprising (a) a polyphenylene ether resin and (b) a polyamide resin, (2) from 3 to 50% by weight, based on the total amount of components (1) and (2), of (c) a block copolymer of an aromatic vinyl compound and butadiene, and (3) from 0.01 to 30 parts by weight, per 100 parts by weight of the total amount of components (1) and (2), of (d) a compound having an unsaturated group and a polar group in the molecule thereof, said polyamide resin (b) being present in an amount of from 30 to 90 parts by weight per 100 parts by weight of the total amount of the polyphenylene ether resin (a) and the polyamide resin (b), and said block copolymer (c) having a Brookfield viscosity of from 600 to 25,000 cps in a 25% by weight toluene solution at 25° C.

2. A resin composition as in claim 1, wherein said polyphenylene ether resin (a) is a homopolymer of 2,6-dimethylphenol or a copolymer of 2,6-dimethylphenol and 2,3,6-trimethylphenol.

3. A resin composition as in claim 1, wherein said polyphenylene ether resin (a) has an intrinsic viscosity of from 0.35 to 0.70 dl/g in 30° C. chloroform.

4. A resin composition as in claim 1, wherein said polyamide resin (b) is nylon-6,6 or nylon-6.

5. A resin composition as in claim 1, wherein said polyamide resin (b) is present in an amount of from 35 to 70 parts by weight per 100 parts by weight of the total amount of the polyphenylene ether resin (a) and the polyamide resin (b).

6. A resin composition as in claim 5, wherein said polyamide resin (b) is present in an amount of from 40 to 60 parts by weight per 100 parts by weight of the total amount of the polyphenylene ether resin (a) and the polyamide resin (b).

7. A resin composition as in claim 1, wherein said component (1) is present in an amount of from 65 to 95% by weight based on the total amount of components (1) and (2).

8. A resin composition as in claim 7, wherein said component (1) is present in an amount of from 70 to 92% by weight based on the total amount of components (1) and (2).

9. A resin composition as in claim 1, wherein said aromatic vinyl compound is at least one of styrene and alkyl-substituted styrene, and said conjugated diene is at least one of butadiene and isoprene.

10. A resin composition as in claim 1, wherein said block copolymer (c) contains from 20 to 50% by weight of a unit derived from the aromatic vinyl compound.

11. A resin composition as in claim 10, wherein said block copolymer (c) contains from 25 to 50% by weight of a unit derived from the aromatic vinyl compound.

12. A resin composition as in claim 11, wherein said block copolymer (c) contains from 31 to 45% by weight of a unit derived from the aromatic vinyl compound.

13. A resin composition as in claim 12, wherein said block copolymer (c) contains from 35 to 45% by weight of a unit derived from the aromatic vinyl compound.

14. A resin composition as in claim 1, wherein said block copolymer (c) has a Brookfield viscosity of from 600 to 10,000 cps in a 25% by weight toluene solution at 25° C.

15. A resin composition as in claim 14, wherein said block copolymer (c) has a Brookfield viscosity of from 800 to 8,000 cps in a 25% by weight toluene solution at 25° C.

16. A resin composition as in claim 1, wherein said component (2) is present in an amount of from 5 to 35% by weight based on the total amount of components (1) and (2).

17. A resin composition as in claim 16, wherein said component (2) is present in an amount of from 8 to 30% by weight based on the total amount of components (1) and (2).

18. A resin composition as in claim 1, wherein said compound having an unsaturated group and a polar group (d) is selected from an unsaturated dicarboxylic acid or an anhydride thereof, an unsaturated alcohol, epoxidized natural fats and oils, and a low molecular polybutadiene having a molecular weight of from about 500 to about 2,500 to which maleic anhydride or maleic acid is added.

19. A resin composition as in claim 18, wherein said compound having an unsaturated group and a polar group (d) is selected from maleic anhydride, maleic acid, oleyl alcohol, epoxidized soybean oil, epoxidized linseed oil, and a low molecular polybutadiene having a molecular weight of from about 500 to about 2,000 to which maleic anhydride or maleic acid is added in an amount of from about 5% to about 20% by weight.

20. A resin composition as in claim 19, wherein said compound having an unsaturated group and a polar group (d) is maleic anhydride or a mixture of maleic anhydride and maleic acid.

21. A resin composition as in claim 1, wherein said compound having an unsaturated group and a polar group (d) is present in an amount of from 0.01 to 15 parts by weight per 100 parts by weight of the total amount of components (1) and (2).

22. A resin composition as in claim 21, wherein said compound having an unsaturated group and a polar group (d) is present in an amount of from 0.05 to 15 parts by weight per 100 parts by weight of the total amount of components (1) and (2).

23. A resin composition as in claim 22, wherein said compound having an unsaturated group and a polar group (d) is present in an amount of from 0.1 to 5 parts by weight per 100 parts by weight of the total amount of components (1) and (2).

24. A resin composition as in claim 23, wherein said compound having an unsaturated group and a polar group (d) is present in an amount of from 0.2 to 2 parts by weight per 100 parts by weight of the total amount of components (1) and (2).

* * * * *